(12) United States Patent
Akifusa

(10) Patent No.: US 12,303,784 B2
(45) Date of Patent: May 20, 2025

(54) STORAGE MEDIUM, INFORMATION-PROCESSING DEVICE, INFORMATION-PROCESSING SYSTEM, AND INFORMATION-PROCESSING METHOD

(71) Applicant: NINTENDO CO., LTD., Kyoto (JP)

(72) Inventor: Yusuke Akifusa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 573 days.

(21) Appl. No.: 17/591,905

(22) Filed: Feb. 3, 2022

(65) Prior Publication Data

US 2023/0241495 A1 Aug. 3, 2023

(51) Int. Cl.
- A63F 13/48 (2014.01)
- A63F 13/44 (2014.01)
- A63F 13/533 (2014.01)
- A63F 13/843 (2014.01)

(52) U.S. Cl.
CPC .............. *A63F 13/48* (2014.09); *A63F 13/44* (2014.09); *A63F 13/533* (2014.09); *A63F 13/843* (2014.09)

(58) Field of Classification Search
CPC ........ A63F 13/48; A63F 13/44; A63F 13/533; A63F 13/843
See application file for complete search history.

(56) References Cited

U.S. PATENT DOCUMENTS

| | | | |
|---|---|---|---|
| 2008/0132334 A1* | 6/2008 | Nonaka | A63F 13/428 463/43 |
| 2013/0065654 A1* | 3/2013 | Matsui | A63F 13/537 463/37 |

FOREIGN PATENT DOCUMENTS

JP 2001-84074 3/2001

OTHER PUBLICATIONS

"How to Ready Up in Fortnite", 6 pages, uploaded on Jul. 7, 2019 by user "Stupid Tutorials", retrieved from Internet: (Year: 2019).*

* cited by examiner

*Primary Examiner* — Jay Trent Liddle
*Assistant Examiner* — Alyssa N Brandley
(74) *Attorney, Agent, or Firm* — Nixon & Vanderhye PC

(57) ABSTRACT

An information-processing device detects a predetermined input performed on each of controllers, while a confirmation screen is displayed on a display device before a game is started. The information-processing device changes a common parameter in response to the predetermined input performed on each of the controllers. The information-processing device changes an object image included in the confirmation screen in accordance with the common parameter. The information-processing device starts the game when the common parameter satisfies a start condition, regardless of whether the predetermined input is detected for all of the controllers.

16 Claims, 3 Drawing Sheets

STORAGE MEDIUM, INFORMATION-PROCESSING DEVICE, INFORMATION-PROCESSING SYSTEM, AND INFORMATION-PROCESSING METHOD

FIELD

An embodiment of the present invention relates to a method for confirming completion of preparation for predetermined processing before the processing is executed.

BACKGROUND AND SUMMARY

There is known in the art a method for confirming completion of preparation for predetermined processing before the processing is executed.

A non-transitory computer-readable storage medium according to an embodiment of the present invention has stored therein instructions that, when executed by a processor of an information-processing device, cause the information-processing device to perform operations comprising: while a confirmation screen is displayed on a display device before a game is started, detecting a predetermined input performed on each of controllers; changing at least one common parameter in response to the predetermined input performed on each of the controllers; changing at least one object image included in the confirmation screen in accordance with the at least one common parameter; and upon detecting that the at least one common parameter satisfies a start condition, starting the game regardless of whether the predetermined input is detected for all of the controllers.

DETAILED DESCRIPTION OF NON-LIMITING EXAMPLE EMBODIMENTS

1. Embodiment

1-1. Configuration

An information-processing system according to an embodiment of the present invention will be described with reference to the drawings.

Figure 1:
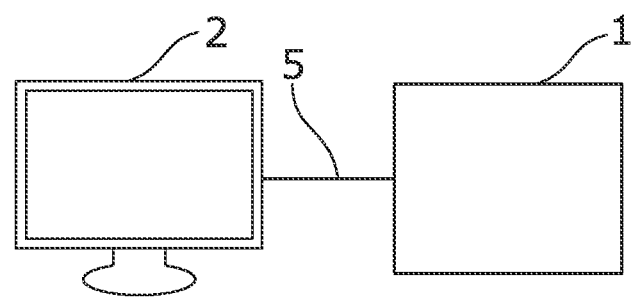
FIG. 1 is a diagram showing an example of an information-processing system.

FIG. 1 is a diagram showing an example of the information-processing system. As shown in the figure, the information-processing system includes game device 1, and TV monitor 2. Of the devices constituting the information-processing system, game device 1 and TV monitor 2 are connected via dedicated line 5, and game device 1 is connected to controllers either by wired or wirelessly.

The information-processing system is a system for allowing users of controllers to play a game.

Before a game is started, preparation for the game is confirmed. Specifically, a confirmation screen is displayed on TV monitor 2. Subsequently, when users of the controllers perform a predetermined number of input operations, the game is started. The number of input operations performed by the users is counted for each team. When a total number counted for each of the teams reaches a predetermined number, the game is started. The confirmation screen displayed on TV monitor 2 includes a gauge image for each of the teams, which shows progress of confirmation for each of the teams.

Hereinafter, the devices constituting the information-processing system will be described.

Figure 2:
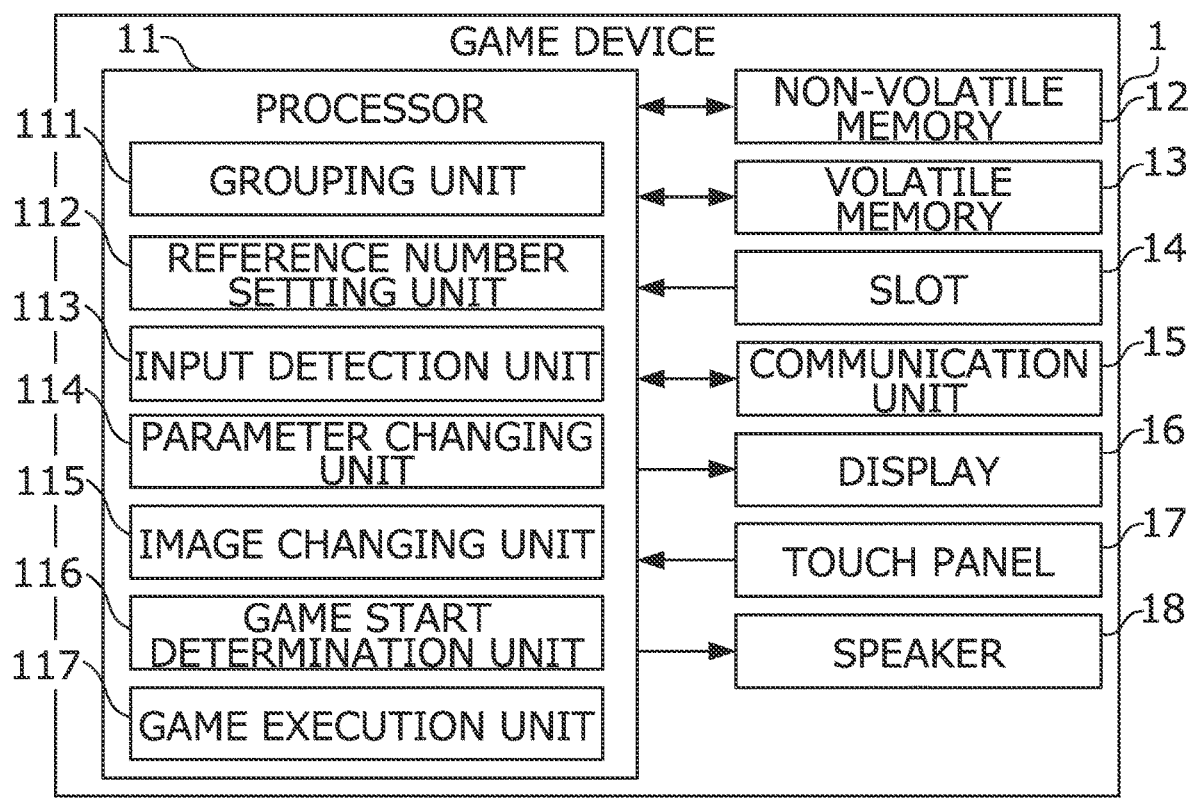
FIG. 2 is a block diagram showing an example of game device 1.

FIG. 2 is a block diagram showing an example of game device 1. As shown in the figure, game device 1 includes processor 11 such as a CPU, non-volatile memory 12 such as a flash memory, volatile memory 13 such as a DRAM, slot 14 into which an external storage medium such as a memory card can be inserted, communication unit 15 for enabling communication via communication line, display 16 such as a liquid crystal display, touch panel 17 placed on display 16, and speaker 18.

Figure 3:
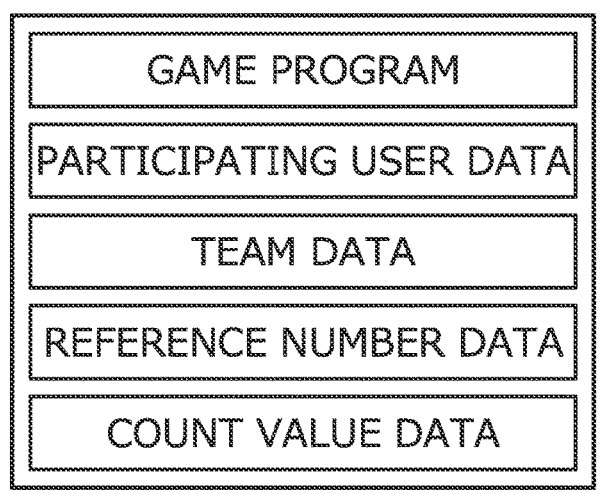
FIG. 3 is a diagram showing an example of a memory map of volatile memory 13.

FIG. 3 is a diagram showing an example of a memory map of volatile memory 13 included in game device 1. As shown in the figure, volatile memory 13 can store a game program that is retrieved from non-volatile memory 12 or an external storage medium. The game program is an information-processing program for allowing users to play a game. This game program is a program that can be distributed via a network such as the Internet or a non-transitory storage medium. Volatile memory 13 also can store participating user data, team data, reference number data, and count value data. Hereinafter, those items of data to be stored in volatile memory 13 will be described.

Participating user data is ID data of users who are participating in a game.

Team data is data indicating members of each of teams. Specifically, team data consists of sets of a team ID and user IDs of team members for each team.

Reference number data is data indicating the number (hereinafter, referred to as "reference number") of input operations that is required to start a game. A reference number indicated by the reference number is set for each team.

Count value data is data indicating a total number (hereinafter, referred to as "count value") of input operations that have been performed by users. A count value indicated by the count value data is calculated for each team.

The above-mentioned game program is loaded into volatile memory 13 and is executed by processor 11. As a result, functions of grouping unit 111, reference number setting unit 112, input detection unit 113, parameter changing unit 114, image changing unit 115, game start determination unit 116 and game execution unit 117 are provided, as shown in FIG. 2.

Grouping unit 111 is configured to divide participating users into two teams such that at least one of the two teams includes two or more users. Grouping unit 111 may perform the division in accordance with an instruction input by a user of game device 1, or may perform the division automatically.

In the present embodiment it is assumed that a game is played as a team game; however, this style of play is merely an example. As another style of play, a game may be played as a one-on-one battle.

Reference number setting unit 112 is configured to set a reference number for each team. When setting a reference number, reference number setting unit 112 multiplies the number of team members by a value "2." For example, when setting a reference number for a team including "4" members, reference number setting unit 112 obtains a reference number "8." By setting a reference number based on the number of team members, reference number setting unit 112 makes it possible that a game is started smoothly as compared with a case where a reference number is set regardless of the number of team members.

Input detection unit 113 is configured, while a confirmation screen is displayed on TV monitor 2, to detect an input operation that is performed on a controller. The input operation to be detected by input detection unit 113 refers to an operation performed to indicate that a user has prepared for starting a game. This input operation is performed using a button on a controller. This input operation can be performed by a user multiple times. To detect this input operation, input detection unit 113 acquires input data that is sent from a controller.

Parameter changing unit 114 is configured, after input detection unit 113 acquires input data, to identify a team to which a sender of the input data belongs. When identifying a team, parameter changing unit 114 identifies a user ID included in the input data, and refers to team data to identify a team ID associated with the identified user ID. After identifying a team, parameter changing unit 114 increments a count value for the identified team.

Image changing unit 115 is configured to change a gauge image included in a confirmation screen in accordance with a count value updated by parameter changing unit 114. The gauge image to be changed by image changing unit 115 is a gauge image for a team that corresponds to the updated count value. When image changing unit 115 changes the gauge image, the unit increases a value shown by the gauge image in accordance with the count value. When the count value reaches a reference number, image changing unit 115 changes the gauge image to an OK image, which shows that users have completed preparation for a game.

Game start determination unit 116 is configured to determine whether a start condition for a game has been satisfied. To make the determination, game start determination unit 116, specifically, determines whether a count value for each team has reached a respective reference number. Game start determination unit 116 performs this determination in order to confirm for each team whether a count value has reached a reference number, not to confirm for each team whether all members have performed an input operation. Accordingly, regardless of whether all members of each team perform an input operation, when a count value for each of teams reaches a respective reference number, a game is started.

Game execution unit 117 is configured to start a game when game start determination unit 116 determines that a start condition for a game has been satisfied.

The foregoing is a description of game device 1.

1-2. Operation

Figure 4:
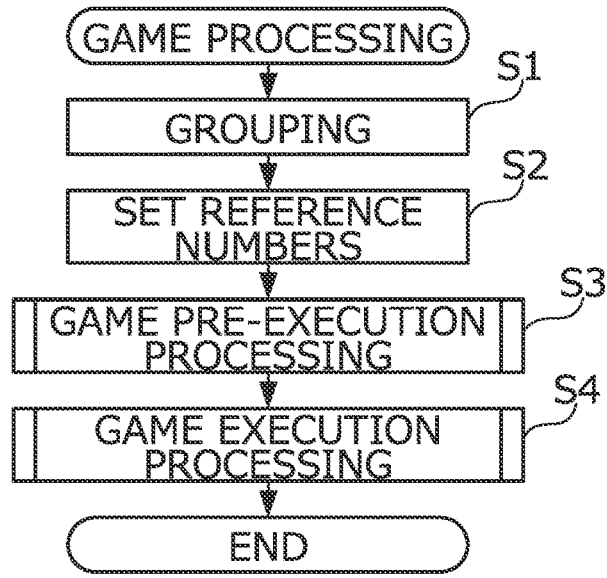
FIG. 4 is a flowchart showing an example of game processing.

Game processing that is performed by game device 1 will be described. FIG. 4 is a flowchart showing an example of the game processing.

Figure 5:
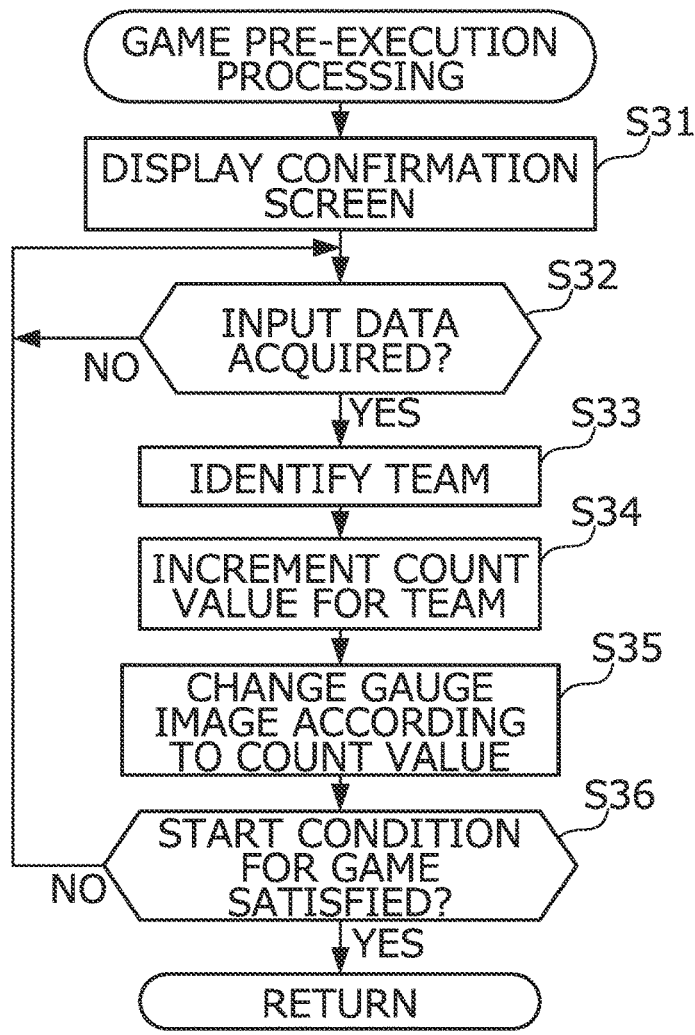
FIG. 5 is a flowchart showing an example of game pre-execution processing.

In the game process shown in the figure, grouping unit 111 initially divides participating users into two teams (step S1). Grouping unit 111 may perform the division in accordance with an instruction of a user of game device 1, or may perform the division automatically. After grouping unit 111 performs the division, reference number setting unit 112 sets a reference number for each of the teams (step S2). When setting a reference number, reference number setting unit 112 multiplies the number of team members by a value "2." After reference number setting unit 112 sets a reference number for each of the teams, game pre-execution processing is carried out (step S3). This game pre-execution processing is processing for confirming completion of preparation for a game prior to start of the game. FIG. 5 is a flowchart showing an example of the game pre-execution processing.

In the game pre-execution processing shown in the figure, a confirmation screen is initially displayed on TV monitor 2 (step S31). The confirmation screen includes two gauge images. One gauge image is a gauge image for X team, and the other gauge image is a gauge image for Y team. Each of the gauge images represents a gauge, a value of which increases in proportion to the number of input operations. It is of note that the confirmation screen may include a description of game rules.

Every time a user presses "A" button on a controller, his/her controller sends to game device 1 input data indicating that "A" button has been pressed.

While the above-mentioned confirmation screen is displayed, input detection unit 113 acquires input data from each of the controllers. Upon acquiring input data from one of the controllers (YES at step S32), parameter changing unit 114 identifies a team to which a user of the controller belongs (step S33). Specifically, parameter changing unit 114 identifies a user ID of the user, and refers to team data to identify a team ID associated with the identified user ID. After identifying a team, parameter changing unit 114 increments a count value for the identified team (step S34).

Subsequent to the update of the count value, image changing unit 115 changes a gauge image for the identified team in accordance with the updated count value (step S35). A gauge value indicated by the gauge image increases in accordance with a count value. When the count value reaches a reference number, the gauge image is changed to OK image.

Subsequent to the update of the gauge image, game start determination unit 116 determines whether a start condition for a game has been satisfied (step S36). To make the determination, game start determination unit 116, specifically, determines whether a count value for each of the teams has reached a respective reference number. As a result of the determination, when a count value for each of the teams reaches a respective reference number (YES at step S36), the present game pre-execution processing ends, and a game is started. On the other hand, as a result of the determination, when a count value for one of the teams does not reach a reference number (NO at step S36), step S32 is carried out again.

After the game pre-execution processing ends, game execution processing that is shown in FIG. 4 is carried out (step S4).

With the end of the game execution process, the game processing shown in FIG. 4 ends.

In the game processing described in the foregoing, a game is started when a predetermined start condition is satisfied. The predetermined start condition is satisfied when a reference number or more of input operations are performed for each team. Each of the input operations required to satisfy the start condition may be performed by a user multiple times. Accordingly, in a case where some users do not perform input operations, the other users can start a game by making up for the inactive users. This feature is useful especially in a case where a large number of users are participating in a game because in such a case it is difficult to require all users to perform input operations.

2. Modifications

The above embodiment may be modified as described below. The modifications described below may be combined with each other.

2-1. Modification 1

Game device 1 is an example of an information-processing device capable of executing the above game program. Instead of game device 1, another information-processing device may execute the above game program. Any input device can be used as a controller.

Part or all of the functions of game device 1 may be provided by server. In essence, arrangement of the functions of the game processing system may be freely determined by a provider of the system.

2-2. Modification 2

The above information-processing system may provide a competitive game or a cooperative game, as an example of a game.

2-3. Modification 3

Game device 1 may cause display 16 of the game device to display a confirmation screen, in addition to or instead of TV monitor 2. Alternatively, game device 1 may cause a projector to show a confirmation screen.

2-4. Modification 4

Parameter changing unit 114 may update a count value in accordance with a duration of a long pressing operation, instead of the number of pressing operations. In that case, reference number setting unit 112 sets a reference time period, instead of a reference number. When a count value reaches a reference time period for each of all teams, a game is started.

2-5. Modification 5

Grouping unit 111 may form three or more teams.

2-6. Modification 6

In the above game pre-execution processing, the number of input operations is counted for each team; however, the number of input operations performed by all users may be aggregated regardless of teams to which they belong. In that case, a count value, a reference number, and a gauge image are prepared for a group of all users, not for each team. When the count value reaches the reference number, a game is started. It is of note that the reference number is obtained by multiplying the number of all users by a value "2."

2-7. Modification 7

In the above embodiment, reference number setting unit 112 calculates a reference number by multiplying the number of team members by a value "2;" however, this calculation method is merely an example. Reference number setting unit 112 may calculate a reference number by multiplying the number of team members by a value other than the value "2." For example, reference number setting unit 112 may multiply the number of team members by a value "½." In that case, decimals of a calculated value may be rounded up.

It is of note that a calculated reference number does not necessarily have to be proportional to the number of team members. For example, an increase in a reference number may be made smaller in proportion to the number of team members.

In essence, any method for setting a reference number may be employed if the method makes it possible that users start a game by performing input operations while some users do not perform input operations.

2-8. Modification 8

The above-mentioned OK image is an example of an image showing that preparation for a game is complete. Instead of this OK image, another preparation completion image such as a check mark image may be displayed.

2-9. Modification 9

The above-mentioned each of the gauge images is an example of an object image that shows progress of confirmation for a team. Instead of this gauge image, an image of another object whose shape, size, or color changes in accordance with a count value may be displayed. Alternatively, a number image representing a count value may be displayed.

2-10. Modification 10

In the above game execution processing, a game is played as a team game; however, a game may be played in an individual game.

What is claimed is:

1. A non-transitory computer-readable storage medium having stored therein instructions that, when executed by a processor of an information-processing device, cause the information-processing device to provide execution comprising:

while a confirmation screen is displayed on a display device before a game is started, detecting input performed on at least a portion of a plurality of controllers;

changing at least one common parameter in response to the input performed on at least the portion of the plurality of controllers;

changing at least one object image included in the confirmation screen in accordance with the at least one common parameter; and upon detecting that the at least one common parameter satisfies a start condition, starting the game regardless of whether the input is detected for all of the controllers from the plurality of controllers, wherein the start condition includes a total number of inputs being greater than or equal to a reference number; and the reference number is larger than a number of the plurality of controllers.

2. The non-transitory computer-readable storage medium according to claim 1, wherein the instructions further cause the information-processing device to provide execution comprising:

dividing the plurality of controllers into groups such that at least one of the groups includes two or more controllers, wherein a common parameter is set for each group, an object image is associated with each group, and the instructions further cause the information-processing device to provide execution that comprises:
  changing one of the object images in accordance with one of the common parameters; and
  starting the game upon detecting that each of the common parameters satisfies the start condition.

3. The non-transitory computer-readable storage medium according to claim 2, wherein
  users of the plurality of controllers are divided into teams such that users of controllers belonging to a same group belong to a same team, and
  the teams compete with each other during execution of the game.

4. The non-transitory computer-readable storage medium according to claim 1, wherein the instructions further cause the information-processing device to provide execution comprising:
  dividing the plurality of controllers into groups such that at least one of the groups includes two or more controllers; and
  changing the at least one common parameter in response to the input performed on each of the controllers regardless of the groups to which the plurality of controllers belong.

5. The non-transitory computer-readable storage medium according to claim 1, wherein the instructions further cause the information-processing device to provide execution comprising, upon detecting that the at least one common parameter satisfies the start condition, changing an object image into an image indicating that preparation for starting the game is complete.

6. The non-transitory computer-readable storage medium according to claim 1, wherein the instructions further cause the information-processing device to provide execution comprising changing a color of the at least one object image in accordance with the at least one common parameter.

7. The non-transitory computer-readable storage medium according to claim 1, wherein the instructions further cause the information-processing device to provide execution comprising changing a size of the at least one object image in accordance with the at least one common parameter.

8. The non-transitory computer-readable storage medium according to claim 1, wherein the instructions further cause the information-processing device to provide execution comprising changing a number indicated by the at least one object image in accordance with the at least one common parameter.

9. The non-transitory computer-readable storage medium according to claim 1, wherein the at least one common parameter is configured to change in association with more than one input being performed on at least one controller from the portion of the plurality of controllers.

10. The non-transitory computer-readable storage medium according to claim 1, wherein the reference number is set based on a number of the plurality of controllers.

11. The non-transitory computer-readable storage medium according to claim 1, wherein
  each controller, of the plurality of controllers, is associated with a player, and
  the reference number is set based on a number of players.

12. The non-transitory computer-readable storage medium according to claim 1, wherein
  a plurality of players participate in the game,
  each player is a team member of a team, and
  the reference number is set for each team.

13. The non-transitory computer-readable storage medium according to claim 12, wherein the reference number is set based on a number of team members.

14. An information-processing device, comprising:
  a display; and
  processing circuitry including at least one processor, wherein the processing circuitry is operatively coupled to the display and the processing circuitry is configured to:
    detect input performed on at least a portion of a plurality of controllers, while a confirmation screen is displayed on the display before a game is started;
    change a common parameter in response to the input performed on at least the portion of the plurality of controllers;
    change an object image included in the confirmation screen in accordance with the common parameter; and
    start the game when the common parameter satisfies a start condition, regardless of whether the input is detected for all of the controllers from the plurality of controllers, wherein
    the start condition includes a total number of inputs being greater than or equal to a reference number; and
  the reference mber is larger than a of the plurality of controllers.

15. An information-processing system, comprising:
  a processor; and
  a memory configured to store computer readable instructions that, when executed by the processor, cause the information-processing system to:
    detect input performed on at least a portion of a plurality of controllers, while a confirmation screen is displayed on a display device before a game is started;
    change a common parameter in response to the input performed on at least the portion of the plurality of controllers;
    change an object image included in the confirmation screen in accordance with the common parameter; and
    start the game when the common parameter satisfies a start condition, regardless of whether the input is detected for all of the controllers from the plurality of controllers, wherein
    the start condition includes a total number of inputs being greater than or equal to a reference number; and
    the reference number is larger than a number of the plurality of controllers.

16. An information-processing method executed by an information-processing device, the method comprising:
  while a confirmation screen is displayed on a display device before a game is started, detecting input performed on at least a portion of a plurality of controllers;
  changing a common parameter in response to the input performed on at least the portion of the plurality of controllers;
  changing an object image included in the confirmation screen in accordance with the common parameter; and
  in association with the common parameter satisfying a start condition, starting the game regardless of whether the input is detected for all of the controllers from the plurality of controllers, wherein
  the start condition includes a total number of inputs being greater than or equal to a reference number; and the reference number is larger than a number of the plurality of controllers.

* * * * *